United States Patent
Wang et al.

(10) Patent No.: US 10,125,248 B2
(45) Date of Patent: Nov. 13, 2018

(54) NUCLEATED POLYPROPYLENE COMPOSITION

(71) Applicant: BOREALIS AG, Vienna (AT)

(72) Inventors: Jingbo Wang, Linz (AT); Pauli Leskinen, Helsinki (FI); Torvald Vestberg, Porvoo (FI); Markus Gahleitner, Neuhofen/Krems (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 15/316,442

(22) PCT Filed: Jun. 17, 2015

(86) PCT No.: PCT/EP2015/063517
§ 371 (c)(1),
(2) Date: Dec. 5, 2016

(87) PCT Pub. No.: WO2015/197434
PCT Pub. Date: Dec. 30, 2015

(65) Prior Publication Data
US 2017/0145197 A1    May 25, 2017

(30) Foreign Application Priority Data
Jun. 27, 2014    (EP) .................................... 14174690

(51) Int. Cl.
C08L 23/12    (2006.01)
C08L 23/08    (2006.01)
C08L 23/18    (2006.01)

(52) U.S. Cl.
CPC .............. *C08L 23/12* (2013.01); *C08L 23/08* (2013.01); *C08L 23/18* (2013.01); C08L 2205/02 (2013.01); C08L 2205/025 (2013.01); C08L 2205/24 (2013.01)

(58) Field of Classification Search
CPC .......... C08L 23/12; C08L 23/08; C08L 23/18; C08L 2205/025; C08L 2205/02; C08L 2205/24
See application file for complete search history.

(56) References Cited

U.S. PATENT DOCUMENTS

| | | | |
|---|---|---|---|
| 5,234,879 A | 8/1993 | Garoff et al. | |
| 2015/0108151 A1* | 4/2015 | Williams et al. | B65D 25/00 220/745 |
| 2016/0115258 A1* | 4/2016 | Hafner et al. | C08F 10/06 526/65 |

FOREIGN PATENT DOCUMENTS

| | | |
|---|---|---|
| CN | 1360616 A | 7/2002 |
| CN | 101243132 A | 8/2008 |
| CN | 101326237 A | 12/2008 |
| CN | 101331187 A | 12/2008 |
| CN | 101891921 A | 11/2010 |
| EP | 0316187 A2 | 5/1989 |
| EP | 0491566 A2 | 12/1991 |
| EP | 0586390 B1 | 3/1992 |
| EP | 0591224 B1 | 3/1992 |
| EP | 0887379 A1 | 6/1998 |
| EP | 0887380 A1 | 6/1998 |
| EP | 0887381 A1 | 6/1998 |
| EP | 0991684 B1 | 6/1998 |
| EP | 1514893 A1 | 3/2005 |
| EP | 1801155 A1 | 12/2005 |
| EP | 2186834 A1 | 11/2008 |
| EP | 2610270 A1 | 12/2011 |
| EP | 2610271 A1 | 12/2011 |
| EP | 2610272 A1 | 12/2011 |
| KR | 2008-0086439 A | 9/2008 |
| WO | 92/19653 A1 | 11/1992 |
| WO | 92/19658 A1 | 11/1992 |
| WO | 1992/19653 A1 | 11/1992 |
| WO | 99/33843 A1 | 12/1998 |
| WO | 99/24478 A1 | 5/1999 |
| WO | 99/24479 A1 | 5/1999 |
| WO | 92/12182 A1 | 12/1999 |
| WO | 00/68315 A1 | 11/2000 |
| WO | 2004/000899 A1 | 12/2003 |
| WO | 2004/055101 A1 | 7/2004 |
| WO | 2004/111095 A1 | 12/2004 |
| WO | 2007/017360 A1 | 2/2007 |
| WO | 2007/071446 A1 | 6/2007 |
| WO | 2012/007430 A1 | 1/2012 |

OTHER PUBLICATIONS http://www.plasticprop.com/articles/tensile-or-flexural-strengthstiffness-there-really-difference, tasken from the World Wide Web on Feb. 13, 2018.*
Zhe Zhou, et al., "A new decoupling method for accurate quantification of polyethylene copolymer composition and triad sequence distribution with 13C NMR", (2007) pp. 225-233.
Luigi Resconi, et al., "Selectivity in Propene Polymerization with Metallocene Catalysts", 2000, pp. 1253-1345.
H. N. Cheng, "13C NMR Analysis of Ethylene-Propylene Rubbers", Hercules Incorporated, Research Center, 1984, pp. 1950-1955.
Vincenzo Busico, et al., "Microstructure of polypropylene", Prog. Polym. Sci., (2001), pp. 443-533.
Vincenzo Busico, et al., "Alk-1-ene Polymerization in the Presence of a Monocyclopentadienyl Zirconium(IV) Acetamidinate Catalyst: Microstructural and Mechanistic Insightsa", (2007), pp. 1128-1134.
Vincenzo Busico, et al., "Full Assignment of the 13C NMR Spectra of Regioregular Polypropylenes: Methyl and Methylene Region", (1997), pp. 6251-6263.
Preliminary Rejection for Korean Patent Application No. 10-2017-7000350.
Chinese Office action for Patent Application No. 201580026610.1, dated Sep. 4, 2018.

* cited by examiner

*Primary Examiner* — Nathan M Nutter
(74) *Attorney, Agent, or Firm* — Tarolli, Sundheim, Covell & Tummino LLP

(57) ABSTRACT

Nucleated polypropylene composition comprising at least one propylene homopolymer wherein the nucleated polypropylene composition and/or the propylene homopolymer can be free of phthalic acid esters as well as their respective decomposition products.

10 Claims, No Drawings

NUCLEATED POLYPROPYLENE COMPOSITION

The present invention is directed to a new nucleated polypropylene composition, a method for producing the same as well as articles made out of the nucleated polypropylene composition for use in various applications in the field of packaging, household or medical applications.

DESCRIPTION OF THE PRIOR ART

Polypropylene compositions are known in the art. The European patent application EP 1 514 893 A1, for example, discloses polypropylene compositions comprising a clarifier selected from one or more phosphate-based α-nucleating agents and/or polymeric nucleating agents, selected from the group consisting of vinylcycloalkane polymers and vinylalkane polymers. Similar nucleating agents are also disclosed in the international applications WO 99/24478 and WO 99/24479. The European patent application EP 0 316 187 A2 discloses a crystalline polypropylene homopolymer incorporated therein a polymer of a vinyl cycloalkane. The international application WO 2004/055101 discloses a heterophasic propylene copolymer, containing nucleating agents, selected from phosphate-derived nucleating agents, sorbitol-derived nucleating agents, metal salts of aromatic or aliphatic carboxylic acids as nucleating agents, polymeric nucleating agents, such as polyvinyl cyclohexane and inorganic nucleating agents, such as talc.

All polypropylene compositions mentioned above are produced using a Ziegler-Natta catalyst, in particular a high yield Ziegler-Natta catalyst (so called fourth and fifth generation type to differentiate from low yield, so called second generation Ziegler-Natta catalysts), which comprises a catalyst component, a co-catalyst component and an internal donor based on phthalate-compositions.

Examples for such catalysts are in particular disclosed in U.S. Pat. No. 5,234,879, WO92/19653, WO 92/19658 and WO 99/33843, incorporated herein by reference.

However, some of such phthalate-compositions are under suspicion of generating negative health and environmental effects. Furthermore, there is an increasing demand on the market for "phthalate-free polypropylene" suitable for various applications, e.g. in the field of packaging and medical applications as well as personal care, or personal hygiene. WO 2012007430 also incorporated herein by reference, is one example of a limited number of patent applications, describing phthalate free catalysts based on citraconate as internal donor.

However, up to now the mechanical properties of polypropylenes produced with catalyst having citraconate compositions as internal donors, did not fulfill all the desired requirements, especially in view of stiffness/impact-balance.

OBJECT OF THE INVENTION

So the present invention concerns a nucleated polypropylene composition and articles produced thereof which fulfil the higher stiffness-impact-requirements and preferably also the legal and health and environmental requirements.

The present invention in a special embodiment deals also with polymerisation method, suitable for the production of the nucleated polypropylene composition.

The present invention in a special embodiment deals with injection moulded articles, made out of the nucleated polypropylene composition.

The present invention in a special embodiment deals with packaging articles, made out of the nucleated polypropylene composition, e.g. thin walled containers.

The present inventions in a special embodiment deals with articles used for medical and diagnostic applications, made out of the nucleated polypropylene composition Surprisingly the inventors have now identified a Nucleated polypropylene composition comprising a) at least one propylene homopolymer and
b) a polymeric nucleating agent wherein the nucleated polypropylene composition and/or the propylene homopolymer is free of phthalic acid esters as well as their respective decomposition products and wherein said nucleated polypropylene composition is characterized by having a sum of [G' (Storage Modulus; measured by Dynamic Mechanical Analysis according to ISO 6721-7)+Flexural Modulus (determined according to ISO178)], each expressed in MPa, of at least 2040 MPa Polymer Settings The polypropylene composition in accordance with the present invention comprises at least one propylene homopolymer component. The modality with respect to molecular weight distribution and thus with respect to melt flow ratio is not critical.

Thus the polypropylene composition in accordance with the present invention may be unimodal or multimodal including bimodal with respect to molecular weight distribution.

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerised.

In one embodiment of the present invention at least two propylene homopolymer components are present.

The modality with respect to molecular weight distribution and thus with respect to melt flow ratio is not critical. Thus the polypropylene composition in accordance with the present invention may be unimodal or multimodal including bimodal with respect to molecular weight distribution The polypropylene composition in accordance with the present invention is preferably multimodal, at least bimodal with respect to the molecular weight distribution concerning the propylene homopolymer components In accordance with the present invention, this embodiment can be realized by including two different propylene homopolymer components, differing with respect to the MFR2.

In another embodiment at least one propylene homopolymer and one propylene-comonomer-rubber phase are present.

In this case the propylene homopolymer and the propylene-comonomer-rubber phase each can be unimodal or bimodal in respect of their MFRs.

When the propylene homopolymer and the propylene-ethylene-rubber phases differ in MFR it is preferred, that the propylene-comonomer-rubber has lower MFR than the propylene homopolymer.

In another embodiment at least one propylene homopolymer and two propylene-comonomer-rubber phase are present.

In yet another embodiment at least two propylene homopolymer and one propylene-comonomer-rubber phase are present.

In a further embodiment at least two propylene homopolymer and two propylene-comonomer-rubber phases are present.

In yet a further embodiment at least one propylene homopolymer and three propylene-comonomer-rubber phases are present.

When there are two propylene homopolymer or two or three propylene-comonomer-rubber phase fractions present, it is preferred, that they differ in MFR compared to the respective homo- or rubber fraction.

When there are two or three propylene-comonomer-rubber phase fractions present, they may differ also in respect to their comonomer content, the comonomer type and/or their intrinsic viscosity of the xylene cold soluble fraction when compared to the respective other propylene-comonomer-rubber phase fraction.

The two or three propylene-comonomer-rubber phase fractions may also differ in more than one aspect.

It is especially preferred when two propylene-comonomer-rubber phase fractions are present that they differ both in comonomer content and intrinsic viscosity.

For all embodiments with at least one propylene-comonomer-rubber phase the weight ratio of the sum of all present propylene homopolymer fractions $P_H$ to the sum of all propylene-comonomer-rubber phase fractions $P_R$, $P_H/P_R$, may be in the range of 9/1 to 1/1, preferably in the range of 8/1 to 3/2, like in the range of 7/1 to 7/3.

If there are two propylene homopolymer fractions (H-PP1 and H-PP2) present, their weight ratio may be preferably in the range of 3/7 to 7/3, preferably in the range of 4/6 to 6/4.

The polypropylene composition in accordance with the present invention has a melt flow rate ($MFR_2$) as measured in accordance with ISO 1133 at 230° C. and 2.16 kg load in the range of 0.1 to 500 g/10 min, preferably in the range of 0.3 to 250 g/10 min, like in the range of 0.4 to 100 g/10 min. Even more preferably the $MFR_2$ is in the range of 1-50 g/10 min.

The $MFR_2$ of the sum of all present propylene homopolymer fractions of the polypropylene composition is in the range of 0.5 to 1000 g/min, preferably in the range of 0.7 to 500 g/min, like in the range of 0.8 to 250 g/10 min.

The propylene homopolymer fractions of the polypropylene composition in accordance with the present invention are predominantly isotactic. In particular, the pentad regularity as determined by $^{13}$C-NMR spectroscopy is at least 95.0 mol %, preferably at least 96.0 mol %, more preferably at least 97.0 mol %.

The intrinsic viscosity, measured according to DIN ISO 1628/1 in decalin at 135° C., of the sum of all propylene-comonomer-rubber phase fractions of the polypropylene composition is in the range of 1.0 to 8.0 dl/g, more preferably in the range of 1.3 to 6.0 dl/g, like in the range of 1.5 to 4.5 dl/g.

Comonomers

The propylene-comonomer-rubber phase of the nucleated propylene composition comprises apart from propylene also a comonomer. Accordingly the term "propylene copolymer" according to this invention is preferably understood as a polypropylene comprising, preferably consisting of, units derivable from
 (a) propylene and
 (b) a comonomer being selected from ethylene and C4 to C10 α-olefins, like butene or hexene. Preferably, the comonomer is ethylene.

The total comonomer content of the nucleated propylene composition may be in the range of 3 to 35 wt. %, preferably in the range of 5 to 30 wt. %, like in the range of 7 to 25 wt. %. The comonomer content of the propylene-ethylene-rubber phase of the nucleated propylene composition may be in the range of 25 to 65 wt. %, preferably in the range of 30 to 60 wt. %, more preferably in the range of 30 to 55 wt. %, like in the range of 32 to 53 wt. %.

Polymeric Nucleating Agent

The polypropylene composition in accordance with the present invention is furthermore characterized in that it comprises a polymeric nucleating agent. Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

Such polymeric nucleating agent can be for instance incorporated by the so called BNT-technology as mentioned below.

The polymeric nucleating agent usually is present in the final product in an amount of from more than 10 ppm, typically more than 15 ppm, (based on the weight of the polypropylene composition). Preferably this agent is present in the polypropylene composition in a range of from 10 to 1000 ppm, more preferably more than 15 to 500 ppm, such as 20 to 100 ppm.

The use of the polymeric nucleating agent in accordance with the present invention enables the preparation of polypropylene compositions having highly satisfactory optical properties and satisfactory mechanical properties, so that it is not required for the compositions in accordance with the present invention to contain low molecular weight nucleating agents, in particular costly particulate nucleating agents like organo-phosphates or soluble nucleants like sorbitol- or nonitol-derived nucleating agents.

Accordingly, the present invention provides an alternative means for improving stiffness/impact balance, while maintaining a satisfying level of haze.

Final Polypropylene Composition:

The polypropylene composition according to the invention has an improved stiffness/impact balance.

The flexural modulus (according to ISO178) of the polypropylene composition according to the invention is at least 1410 MPa up to 3000 MPa, provided there is a comonomer present.

The flexural modulus (according to ISO178) of the polypropylene homopolymer composition according to the invention is at least 1900 MPa. It may range up to 3500 MPa.

It is preferred that the flexural modulus (according to ISO178) of the polypropylene homopolymer composition according to the invention is in the range of 1930-3000 MPa, more preferably 1950-2800 MPa.

The G' (Storage Modulus) measured by Dynamic Mechanical Analysis of the polypropylene composition according to the invention is at least 635 MPa, preferably more than 645 MPa. In the absence of a comonomer the G' measured by Dynamic Mechanical Analysis of the polypropylene composition according to the invention is at least 1040 MPa, preferably more than 645 MPa.

The sum of [G' (Storage Modulus, measured by Dynamic Mechanical Analysis according to ISO 6721-7)+Flexural Modulus (determined according ISO178)] is at least 2040 MPa, preferably more than 2060 MPa or more than 2070 MPa.

In the absence of a comonomer the sum of [G' (Storage Modulus, measured by Dynamic Mechanical Analysis according to ISO 6721-7)+Flexural Modulus (determined according ISO178)] may be at least 2975 up to 5000 MPa, preferably more than 2995 MPa up to 4950 MPa.

The Charpy Notched impact Strength according to ISO 179/1 eA at +23° C. (NIS+23° C.) is at least 1.8 kJ/m$^2$, preferably more than 2 kJ/m$^2$ If the polypropylene composition according to the invention comprises at least a propylene-comonomer rubber, then the NIS+23° C. may be at least 5 kJ/m$^2$, preferably more than 5.7 kJ/m$^2$, or more than 6.4 kJ/m$^2$, even more preferably more than 7 kJ/m$^2$.

If the polypropylene composition according to the invention comprises two propylene homopolymer fractions only (H—PP1 and H—PP2) the composition preferably has a sum of [G' (measured by Dynamic Mechanical Analysis according to ISO 6721-7)+Flexural Modulus (determined according ISO178)] of at least 2970, preferably 2995 MPa and a NIS at 23° C. of at least 1.8 kJ/m$^2$, preferably of at least 2 kJ/m$^2$ If the polypropylene composition according to the invention comprises least a propylene-copolymer-rubber phase, the composition preferably has a sum of (G'+Flex Modulus) of at least 2060, preferably more than 2070 and a NIS at 23° C. of at least, 5 kJ/m$^2$ preferably more than 5.7 kJ/m$^2$, or more than 6.4 kJ/m$^2$, even more preferably more than 7 kJ/m$^2$ . . . .

For the purpose of the present invention "nucleated propylene polymer" stands for a polymer having an increased and controlled degree of crystallinity and a crystallization temperature Tc as determined by differential scanning calorimetry (DSC) which is at least 7 C, preferably at least 10° C. and in particular over 13° C. higher than the crystallization temperature of the corresponding non-nucleated polymer, being higher than 120° C., preferably over 124° C. and in particular over 126° C. The crystallinity of the propylene polymer of the invention as determined by DSC is preferably above 50%.

Preparation Process:

The polypropylene composition in accordance with the present invention may be prepared by any suitable process, including in particular blending processes such as mechanical blending including mixing and melt blending processes and any combinations thereof as well as in-situ blending during the polymerisation process of the propylene polymer component(s). These can be carried out by methods known to the skilled person, including batch processes and continuous processes.

It is also possible to prepare the polypropylene composition in accordance with the present invention by a single-stage polymerisation process or by a sequential polymerisation process, wherein the single components of the polypropylene composition are prepared, one after the other, in the presence of the already prepared components. Such a sequential process for preparing the polypropylene composition is preferred and yields a reactor blend (in-situ blend) or reactor made polymer composition, which means herein the reaction product obtained from a polymerisation reaction wherein, for example, the propylene components (i.e. the propylene homo polymer(s) and/or the propylene-copolymer rubber phase or phases) are polymerised in the presence of the polymeric nucleating agent.

Another embodiment, different to the above mentioned in-situ blend, is a mechanical blend of a polymer with a nucleating agent, wherein the polymer is first produced in the absence of a polymeric nucleating agent and is then blended mechanically with the polymeric nucleating agent or with a small amount of nucleated polymer or with polymers, which already contain the polymeric nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric nucleating agent in the polypropylene composition, even at high concentrations of polymer nucleating agent.

As outlined above, the reactor made polymer composition is a preferred embodiment of the present invention, although also mechanical blends prepared, for example, by using master batch technology are envisaged by the present invention.

Similar considerations also apply with respect to the preparation of multimodal including bimodal polypropylene compositions. While such multimodal or bimodal components may also be prepared by mechanical blending processes, it is preferred in accordance with the present invention to provide such multimodal or bimodal compositions in the form of a reactor made compositions, meaning that the second (or any further) component is prepared in the presence of the first component (or any preceding components).

In a further preferred embodiment of the present invention, the polymeric nucleating agent is introduced into the polypropylene composition by means of a suitably modified catalyst, i.e. the catalyst to be used in catalysing the polymerisation of the propylene polymer is subjected to a polymerisation of a suitable monomer for the polymeric nucleating agent to produce first said polymeric nucleating agent (so called BNT-technology is mentioned below). The catalyst is then introduced together with the obtained polymeric nucleating agent to the actual polymerisation step of the propylene polymer component(s).

In a particularly preferred embodiment of the present invention, the propylene polymer is prepared in the presence of such a modified catalyst to obtain said reactor made polypropylene composition. With such modified catalyst, it is also possible to carry out the above-identified preferred polymerisation sequence for the preparation of in-situ blended multimodal, including bimodal, polypropylenes.

The polypropylene composition according to the invention is preferably prepared by a sequential polymerisation process, as described below, in the presence of a catalyst system comprising a Ziegler-Natta Catalyst (ZN-C), a cocatalyst (Co) and optionally an external donor (ED), as described below.

Sequential Polymerisation

The term "sequential polymerisation system" indicates that the nucleated polypropylene composition is produced in at least two reactors connected in series. Accordingly, the present polymerisation system comprises at least a pre-polymerisation reactor (PR), a first polymerisation reactor (R1) and a second polymerisation reactor (R2), and optionally a third polymerisation reactor (R3) or a fourth polymerisation reactor (R4). The term "polymerisation reactor" shall indicate that the main polymerisation takes place.

Preferably, at least one of the two polymerisation reactors (R1) and (R2) is a gas phase reactor (GPR). Still more preferably the second polymerisation reactor (R2) and the optional third polymerisation reactor (R3) or a fourth polymerisation reactor (R4). are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerisation reactor (R1) is preferably a slurry reactor (SR) and can be any continuous or simple stirred batch tank reactor or loop reactor operating in bulk or slurry. Bulk means a polymerisation in a reaction medium that comprises of at least 60% (w/w) monomer. According to the present invention the slurry reactor (SR) is preferably a (bulk) loop reactor (LR). Accordingly the average concentration of the first fraction (1st F) of the propylene homopolymer (i.e. the first propylene homopolymer fraction (H-PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerisation reactor (R1), i.e. the first propylene homopolymer fraction (H-PP1), more preferably the polymer slurry of the loop reactor (LR) containing the first propylene homopolymer fraction (H-PP1), is directly fed into the second polymerisation reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerisation reactor (R1), i.e. of the loop reactor (LR), the polymer slurry comprising the the first propylene homopolymer fraction (H-PP1), is led directly to the next stage gas phase reactor.

Alternatively, the propylene homopolymer of the first polymerisation reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerisation reactor (R2), i.e. into the gas phase reactor (GPR). Accordingly, this "indirect feed" refers to a process wherein the content of the first polymerisation reactor (R1), of the loop reactor (LR), i.e. the polymer slurry, is fed into the second polymerisation reactor (R2), into the (first) gas phase reactor (GPR1), via a reaction medium separation unit and the reaction medium as a gas from the separation unit.

More specifically, the second polymerisation reactor (R2) and any subsequent reactor, for instance the third polymerisation reactor (R3), or the fourth polymerisation reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerisation reactor (R1) is a slurry reactor (SR), like loop reactor (LR), whereas the second polymerisation reactor (R2) and any optional subsequent reactor, like the third polymerisation reactor (R3), or the fourth polymerisation reactor (R4) are gas phase reactors (GPRs). Accordingly for the instant process at least two, preferably two polymerisation reactors (R1) and (R2) or three polymerisation reactors (R1), (R2) and (R3), or four polymerisation reactors (R1), (R2) (R3), and (R4) namely a slurry reactor (SR), like loop reactor (LR) and a (first) gas phase reactor (GPR1) and optionally a second gas phase reactor (GPR2), or a third gas phase reactor (GPR3) connected in series are used. Prior to the slurry reactor (SR) a pre-polymerisation reactor is placed.

As the process covers also a pre-polymerisation step all of the Ziegler-Natta catalyst (ZN-C) is fed in the pre-polymerisation reactor. Subsequently the pre-polymerisation product containing the Ziegler-Natta catalyst (ZN-C) is transferred into the first polymerisation reactor (R1).

A preferred multistage process is a "loop-gas phase"-process, such as developed by Borealis A/S, Denmark (known as BORSTAR® technology) is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen. Accordingly it is preferred that the operating temperature in the first polymerisation reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerisation reactor (R2) and optional in the third reactor (R3) or the fourth reactor (R4) is in the range of 75 to 95° C., more preferably in the range of 78 to 92° C.

Preferably the operating temperature in the second polymerisation reactor (R2) is equal to or higher than the operating temperature in the first polymerisation reactor (R1). Accordingly it is preferred that the operating temperature (a) in the first polymerisation reactor (R1) is in the range of 62 to 85° C., more preferably in the range of 65 to 82° C., still more preferably in the range of 67 to 80° C., like 70 to 80° C.; and (b) in the second polymerisation reactor (R2) is in the range of 75 to 95° C., more preferably in the range of 78 to 92° C., still more preferably in the range of 78 to 88° C., with the proviso that the operating temperature in the in the second polymerisation reactor (R2) is equal or higher to the operating temperature in the first polymerisation reactor (R1).

Typically the pressure in the first polymerisation reactor (R1), preferably in the loop reactor (LR), is in the range from 20 to 80 bar, preferably 30 to 70 bar, like 35 to 65 bar, whereas the pressure in the second polymerisation reactor (R2), i.e. in the (first) gas phase reactor (GPR1), and optionally in any subsequent reactor, like in the third polymerisation reactor (R3), e.g. in the second gas phase reactor (GPR2), or in a fourth polymerisation reactor (R4), e.g. in the third gas phase reactor (GPR3). is in the range from 5 to 50 bar, preferably 15 to 40 bar. Preferably hydrogen is added in each polymerisation reactor in order to control the molecular weight, i.e. the melt flow rate MFR2.

Preferably the average residence time is rather long in the polymerisation reactors (R1) and (R2). In general, the average residence time (i) is defined as the ratio of the reaction volume (VR) to the volumetric outflow rate from the reactor (Qo) (i.e. VR/Qo), i.e $\tau$=VR/Qo [tau=VR/Qo]. In case of a loop reactor the reaction volume (VR) equals to the reactor volume. Accordingly the average residence time ($\tau$) in the first polymerisation reactor (R1) is preferably at least min, more preferably in the range of 15 to 80 min, still more preferably in the range of 20 to 60 min, like in the range of 24 to 50 min, and/or the average residence time ($\tau$) in the second polymerisation reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ($\tau$) in the third polymerisation reactor (R3) or in the fourth polymerisation reactor (R4)—if present—is preferably at least 30 min, more preferably in the range of 30 to 120 min, still more preferably in the range of 40 to 100 min, like in the range of 50 to 90 min.

As mentioned above the preparation of the propylene polymer comprises in addition to the (main) polymerisation of the propylene polymer in the at least two polymerisation reactors (R1, R2 and optional R3 or R4) prior thereto a pre-polymerisation in a pre-polymerisation reactor (PR) upstream to the first polymerisation reactor (R1).

In the pre-polymerisation reactor (PR) a polypropylene (Pre-PP) is produced. The pre-polymerisation is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerisation step. However, this shall not exclude the option that at a later stage for instance further co-catalyst (Co) and/or external donor (ED) is added in the polymerisation process, for instance in the first reactor (R1). In one embodiment the Ziegler-Natta catalyst (ZN-C), the co-catalyst (Co), and the external donor (ED) are only added in the pre-polymerisation reactor (PR).

The pre-polymerisation reaction is typically conducted at a temperature of 0 to 60° C., preferably from 15 to 50° C., and more preferably from 20 to 45° C.

The pressure in the pre-polymerisation reactor is not critical but must be sufficiently high to maintain the reaction mixture in liquid phase. Thus, the pressure may be from 20 to 100 bar, for example 30 to 70 bar.

In a preferred embodiment, the pre-polymerisation is conducted as bulk slurry polymerisation in liquid propylene, i.e. the liquid phase mainly comprises propylene, with optionally inert components dissolved therein. Furthermore, according to the present invention, an ethylene feed can be employed during pre-polymerisation as mentioned above.

It is possible to add other components also to the pre-polymerisation stage. Thus, hydrogen may be added into the pre-polymerisation stage to control the molecular weight of the polypropylene (Pre-PP) as is known in the art. Further, antistatic additive may be used to prevent the particles from adhering to each other or to the walls of the reactor.

The precise control of the pre-polymerisation conditions and reaction parameters is within the skill of the art.

Due to the above defined process conditions in the pre-polymerisation, a mixture (MI) of the Ziegler-Natta catalyst (ZN-C) and the polypropylene (Pre-PP) produced in the pre-polymerisation reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerisation reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

Accordingly, the propylene polymer is preferably produced in a process comprising the following steps under the conditions set out above:

a) In the pre-polymerisation, a mixture (MI) of the Ziegler-Natta catalyst (ZN-C) and the polypropylene (Pre-PP) produced in the pre-polymerisation reactor (PR) is obtained. Preferably the Ziegler-Natta catalyst (ZN-C) is (finely) dispersed in the polypropylene (Pre-PP).

Subsequent to the pre-polymerisation, the mixture (MI) of the Ziegler-Natta catalyst (ZN-C) and the polypropylene (Pre-PP) produced in the pre-polymerisation reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

b) In the first polymerisation reactor (R1), i.e. in a loop reactor (LR), propylene is polymerised obtaining a first propylene homopolymer fraction (H-PP1) of the propylene homopolymer (H-PP), transferring said first propylene homopolymer fraction (H-PP1) to a second polymerisation reactor (R2), c) in the second polymerisation reactor (R2) propylene is polymerised in the presence of the first propylene homopolymer fraction (H-PP1) obtaining a second propylene homopolymer fraction (H-PP2) of the propylene homopolymer, or a first propylene-rubber-fraction (R-PP1)

Said fractions [H-PP1+H-PP2] or [H-PP1+R-PP1] may be further transferred to a third polymerisation reactor R3 obtaining a first or a second propylene rubber fraction (R-PP1 or R-PP2) in the presence of all fractions produced in earlier steps.

Optionally it is possible to transfer the entire polymer produced up to then to a fourth polymerisation reactor R4, obtaining a second or a third propylene-rubber fraction (R-PP2 or R-PP3) in the presence of all fractions produced in earlier steps.

So the nucleated polymer produced may comprise the following fractions:

The polypropylene (Pre-PP) produced in the pre-polymerisation reactor (PR)+a first propylene homopolymer fraction (H-PP1)+a second propylene homopolymer fraction (H-PP2) or the polypropylene (Pre-PP) produced in the pre-polymerisation reactor (PR)+a first propylene homopolymer fraction (H-PP1)+a first propylene rubber fraction (R-PP1) or the polypropylene (Pre-PP) produced in the pre-polymerisation reactor (PR)+a first propylene homopolymer fraction (H-PP1)+a second propylene homopolymer fraction (H-PP2)+a first propylene rubber fraction (R-PP1) or the polypropylene (Pre-PP) produced in the pre-polymerisation reactor (PR)+a first propylene homopolymer fraction (H-PP1)+a first propylene rubber fraction (R-PP1)+a second propylene rubber fraction (R-PP2) or the polypropylene (Pre-PP) produced in the pre-polymerisation reactor (PR)+a first propylene homopolymer fraction (H-PP1)+a first propylene rubber fraction (R-PP1)+a second propylene rubber fraction (R-PP2)+a third propylene rubber fraction (R-PP3) or the polypropylene (Pre-PP) produced in the pre-polymerisation reactor (PR)+a first propylene homopolymer fraction (H-PP1)+a second propylene homopolymer fraction (H-PP2)+a first propylene rubber fraction (R-PP1)+a second propylene rubber fraction (R-PP2).

Preferred options of the nucleated polymer composition comprise

The polypropylene (Pre-PP) produced in the pre-polymerisation reactor (PR)+a first propylene homopolymer fraction (H-PP1)+a second propylene homopolymer fraction (H-PP2) or the polypropylene (Pre-PP) produced in the pre-polymerisation reactor (PR)+a first propylene homopolymer fraction (H-PP1)+a first propylene rubber fraction (R-PP1) or the polypropylene (Pre-PP) produced in the pre-polymerisation reactor (PR)+a first propylene homopolymer fraction (H-PP1)+a second propylene homopolymer fraction (H-PP2)+a first propylene rubber fraction (R-PP1) or The polypropylene (Pre-PP) produced in the pre-polymerisation reactor (PR)+a first propylene homopolymer fraction (H-PP1)+a first propylene rubber fraction (R-PP1)+a second propylene rubber fraction (R-PP2).

Especially preferred options are nucleated polymer composition consisting of the fractions of:

The polypropylene (Pre-PP) produced in the pre-polymerisation reactor (PR)+a first propylene homopolymer fraction (H-PP1)+a second propylene homopolymer fraction (H-PP2) or the polypropylene (Pre-PP) produced in the pre-polymerisation reactor (PR)+a first propylene homopolymer fraction (H-PP1)+a first propylene rubber fraction (R-PP1) or the polypropylene (Pre-PP) produced in the pre-polymerisation reactor (PR)+a first propylene homopolymer fraction (H-PP1)+a first propylene rubber fraction (R-PP1)+a second propylene rubber fraction (R-PP2)

When the nucleated polymer composition consists of the fractions mentioned above, it is understood, that the composition still may comprise the usual additives for utilization with polyolefins, such as pigments (e.g. TiO2 or carbon black), stabilizers, acid scavengers and/or UV-stabilisers, lubricants, antistatic agents and utilization agents (such as processing aid agents)

The amount of such additives usually is 10 wt % or less, preferably 5 wt % or less.

Catalyst System

As pointed out above in the specific process for the preparation of the polypropylene nucleated propylene composition as defined above a Ziegler-Natta catalyst (ZN-C) is used.

Accordingly the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a phthalate or preferably a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or $MgCl_2$, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or $a_3$) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or $a_4$) providing a solution of Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \le n < 2$, $0 \le m < 2$ and $n+m+(2-n-m)=2$, provided that both n and m $\ne 0$, $0 < n' \le 2$ and $0 < m' \le 2$; and b) adding said solution from step a) to at least one compound (TC) of a transition metal of Group 4 to 6 and c) obtaining the solid catalyst component particles, and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion-solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4.1 to 1:4.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium are used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula R" (OH)$_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl$_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane and or with TiCl$_4$ Washing solutions can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m$^2$, more preferably below 10 g/m$^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst (ZN-C) is preferably used in association with an alkyl aluminum cocatalyst and optionally external donors.

As further component in the instant polymerisation process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R_c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

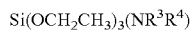

Si(OCH$_2$CH$_3$)$_3$(NR$^3$R$^4$)

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst (ZN-C) is preferably modified by the so called BNT-technology during the above described pre-polymerisation step in order to introduce the polymeric nucleating agent.

Such a polymeric nucleating agent is as described above a vinyl polymer, such as a vinyl polymer derived from monomers of the formula

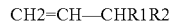

CH2=CH—CHR1R2 wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The polymerisation of the vinyl compound, e. g. VCH, can be done in any inert fluid that does not dissolve the polymer formed (e. g. polyVCH). It is important to make sure that the viscosity of the final catalyst/polymerised vinyl compound/inert fluid mixture is sufficiently high to prevent the catalyst particles from settling during storage and transport.

The adjustment of the viscosity of the mixture can be done either before or after the polymerisation of the vinyl compound. It is, e. g., possible to carry out the polymerisation in a low viscosity oil and after the polymerisation of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerised vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerisation of a vinyl compound should be sufficient to allow for complete reaction of the vinyl monomer, i. e. the polymerisation is continued until the amount of unreacted vinyl compounds in the reaction mixture (including the polymerisation medium and the reactants) is less than 0.5 wt-%, in particular less than 2000 ppm by weight (shown by analysis). Thus, when the prepolymerised catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerisation time of at least 30 minutes is required, preferably the polymerisation time is at least 1 hour and in particular at least 5 hours. Polymerisation times even in the range of 6 to 50 hours can be used. The modification can be done at temperatures of 10 to 70° C., preferably 35 to 65° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerisation catalyst. The preferred embodiments as described previously in the present application with respect to the vinyl compound also apply with respect to the polymerisation catalyst of the present invention and the preferred polypropylene composition in accordance with the present invention. Suitable media for the modification step include, in addition to oils, also aliphatic inert organic solvents with low viscosity, such as pentane and heptane. Furthermore, small amounts of hydrogen can be used during the modification.

Final Articles Made from Nucleated Polypropylene Compositions

The polypropylene composition according to the invention can be used in various application fields, due to its improved stiffness/impact balance.

Thus, the polypropylene composition according to the invention can be used for the preparation of injection moulded articles.

It is especially suitable for preparing packaging articles, e.g. thin wall packaging articles.

The thin wall packaging articles, like thin wall packaging articles produced by injection molding, preferably have a thickness of equal or below 2 mm, preferably in the range of 0.2 to 2.0 mm. Further the thin wall packaging elements are preferably selected from the group consisting of cups, boxes, trays, pails, buckets, bowls, lids, flaps, caps, CD covers, DVD covers and the like.

The polypropylene composition according to the invention can be further used for medical and diagnostic applications, e.g. syringe barrels and/or plungers, containers, bottles, trays, petri dishes, for collecting various liquids, laboratory equipment, laboratory consumables like pipette, pipette tips, etc.

In the following the present invention is further illustrated by means of examples Test Methods A. Measuring Methods The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra. Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

$MFR_2$ (230° C.) is measured according to ISO 1133 (230° C., 2.16 kg load)

The xylene soluble fraction at room temperature (XS, wt.-%): The amount of the polymer soluble in xylene is determined at 25° C. according to ISO 16152; 5$^{th}$ edition; 2005 July 1.

Differential scanning calorimetry (DSC) analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_f$) are determined from the second heating step.

The glass transition temperature Tg is determined by dynamic mechanical analysis (DMA) according to ISO 6721-7. The measurements are done in torsion mode on compression moulded samples (40×10×1 mm$^3$) between −100° C. and +150° C. with a heating rate of 2° C./min and a frequency of 1 Hz.

Storage modulus G' is determined at +23° C. according ISO 6721-7:1996. The measurements are done in torsion mode on compression moulded samples (40×10×1 mm3) between −150° C. and +150° C. with a heating rate of 2° C./min and a frequency of 1 Hz.

Tensile test: The tensile modulus was measured at 23° C. according to ISO 527-1 (cross head speed 1 mm/min) using injection moulded specimens moulded at 180° C. or 200° C. according to ISO 527-2(1B), produced according to EN ISO 1873-2 (dog 10 bone shape, 4 mm thickness).

Flexural Modulus: The flexural modulus was determined in 3-point-bending at 23° C. according to ISO 178 on 80×10×4 mm3 test bars injection moulded in line with EN ISO 1873-2.

The sum of [G' (measured by Dynamic Mechanical Analysis—DMA—according to ISO 6721-7)+Flexural Modulus (determined according ISO178)], further referred to as "sum of (G'+Flex Modulus)" each expressed in MPa is understood as follows:

Material A) has a G' according DMTA of 740 MPa and a Flexural Modulus according ISO 178 of 710 MPa, then the sum of [G' (measured by Dynamic Mechanical Analysis according to ISO 6721-7)+Flexural Modulus (determined according to ISO178)] each expressed in MPa is 1450 MPa.

Charpy notched impact test (NIS+23° C.): The Charpy notched impact strength (NIS) was measured according to ISO 179 1 eA at +23° C., using injection molded bar test specimens of 80×10×4 mm$^3$ prepared in accordance with ISO 294-1:1996.

Haze was determined according to ASTM D1003-00 on 60×60×2 mm$^3$ plaques injection molded in line with EN ISO 1873-2 using a melt temperature of 200° C.

ICP Analysis (Al, Mg, Ti)

The elemental analysis of a catalyst was performed by taking a solid sample of mass, M, cooling over dry ice. Samples were diluted up to a known volume, V, by dissolving in nitric acid (HNO$_3$, 65%, 5% of V) and freshly de-ionized (DI) water (5% of V). The solution was further diluted with DI water up to the final volume, V, and left to stabilize for two hours.

The analysis was run at room temperature using a Thermo Elemental iCAP 6300 Inductively Coupled Plasma-Optical Emission Spectrometer (ICP-OES) which was calibrated using a blank (a solution of 5% HNO$_3$), and standards of 0.5 ppm, 1 ppm, 10 ppm, 50 ppm, 100 ppm and 300 ppm of Al, Mg and Ti in solutions of 5% HNO$_3$.

Immediately before analysis the calibration is 'resloped' using the blank and 100 ppm standard, a quality control sample (20 ppm Al, Mg and Ti in a solution of 5% HNO$_3$ in DI water) is run to confirm the reslope. The QC sample is also run after every 5$^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

The amount of residual VCH in the catalyst/oil mixture was analysed with a gas chromatograph. Toluene was used as internal standard.

Chemicals Used in the Examples:
2-ethyl-hexanol—CAS no 104-76-7
propylene glycol butyl mono ether—CAS no 5131-66-8, provided by Sigma-Aldrich
bis(2-ethylhexyl) citraconate—CAS no 1354569-12-2
Necadd 447-provided by M-I SWACO
Viscoplex 1-254—provided by RohMax Additives GmbH
diethyl aluminum chloride—CAS no 96-10-6, provided by Witco

EXAMPLES

Example 1

1a) Catalyst Preparation 3.4 liter of 2-ethylhexanol and 810 ml of propylene glycol butyl monoether (in a molar ratio 4/1) were added to a 20 l reactor. Then 7.8 liter of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by $N_2$ sparging for 20 minutes to yield an air sensitive powder.

1b) VCH Modification of the Catalyst

−35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinylcyclohexane (VCH) was added.). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

1c) Polymerisation-Inventive Example 1

41 mg of donor D (TEAL/Donor ratio 10 mol/mol) and 206 mg of TEAL(TEAL/Ti ratio 250 mol/mol) was mixed with 30 ml of pentane. Donor to titanium was 25 mol/mol. Half of this mixture was added to the 5 liter stirred reactor and half was added to 209 mg of the oil/catalyst mixture (=124.7 mg of dry catalyst). After 10 minutes the pentane/catalyst/TEAL/donorD mixture was added to the reactor, followed by 300 mmol H2 and 1.4 kg of propylene at room temperature. The temperature was increased to 80° C. during 16 minutes and was kept at this temperature for 1 hour. Unreacted propylene was flashed out by opening the exhaust valve. The reactor was opened and the polymer powder was collected and weighed.

MFR, isotacticity, thermal properties and stiffness of the polymer is shown in table 1.

Comparative Example 1

In this example the same catalyst as in example 1 was used, but the catalyst was used as such without VCH modification of the catalyst. 43 mg of catalyst was used and the hydrogen amount was 170 mmol, but otherwise the polymerisation conditions were the same as in example 1. The results are collected in table 1. From the table it is seen that the VCH modified catalyst (Example 1) has about 10° C. higher crystallisation temperature than the catalyst without VCH modification (Comparative example 1)

Comparative Example 2

C2a) Comparative Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP491566, EP591224 and EP586390.

C2b) VCH modification of the catalyst

This example was done in accordance with Example 1 b, but as catalyst was used a phthalate containing catalyst prepared according to example C2a). (Ti content 1.8 wt %) 52 ml of oil, 1.17 g TEAL, 0.73 g donor D were used. The reaction temperature was 65° C. with this catalyst. The concentration of unreacted VCH in the final catalyst was 200 ppm weight. The concentration of unreacted VCH is almost twice as high with this phthalate containing catalyst, despite the higher reaction temperature, as with the phthalate free catalyst described in example 1 b.

C2c) Polymerisation

Polymerisation was done in accordance to example 1, but using the catalyst prepared in this comparative example. 22 mg of donor D, 176 mg of TEAL and 84.4 mg of the oil/catalyst mixture was used, giving a donor to titanium ratio of 25 mol/mol. 620 mmol of hydrogen was used.

MFR, isotacticity, thermal properties and stiffness of the polymer is shown in table 1.

C3. Comparative Example 3

This example was done in accordance with comparative example C2c with the same catalyst, but the catalyst was used as such without VCH modification. 12.6 mg of catalyst was used and the hydrogen amount was 320 mmol, but otherwise the same polymerisation conditions as in comparative example 2 was used. The results are shown in table 1.

TABLE 1

Bench-scale polymers and characteristics

| | | Inv. Ex. 1 | Comp. Ex 1 | Comp. Ex. 2 | Comp. Ex. 3 |
|---|---|---|---|---|---|
| Residual VCH | ppm | 120 | — | 200 | — |
| Activity | kgPP/gcath | 31 | 18 | 69 | 61 |
| MFR | g/10 min | 16 | 7.5 | 20 | 6.8 |
| mmmm | % | 97.5 | 97.8 | 97.9 | 97.1 |
| Tc | ° C. | 128.2 | 117.4 | 128.5 | 117.5 |
| Tm | ° C. | 167.3 | 164.5 | 167.6 | 165.9 |
| Crystallinity | % | 52.2 | 51.9 | 54.6 | 52.1 |
| Flexural modulus | MPa | 1990 | 1680 | 2040 | 1700 |

From table 1 it can be seen that the in reactor nucleated phthalate free catalyst used in example 1 gives very high conversion rate, especially seen in the lower amount of residual VCH. While nucleating effect, especially seen in the crystallisation temperature, and stiffness remain on the same level as in the comparative example 2 using a phthalate containing catalyst.

Inventive Example 2 (IE2)+Inventive Example 3 (IE3)

Catalyst prepared according to the method of example 1a was modified with VCH in the same way as is described in example 1 b, only on a bigger scale. (Ti content of 3.0 wt %). 41 liters of oil, 1.79 kg of TEAL, 0.79 kg of donor D, 5.5 kg of catalyst and 5.55 kg of VCH was used. The concentration of unreacted VCH in the oil/catalyst mixture after the reaction was 150 ppm weight.

Inventive examples IE2 and IE3 and the comparative examples CE4 and CE5 were produced in a Borstar® pilot plant with a prepolymerisation reactor, one slurry loop reactor and two gas phase reactors. For the inventive examples IE2 and IE3 the prepolymerised catalyst of example 1 was applied, while for the comparative examples CE4 and CE5 the unmodified catalyst of comparative example 1 was applied.

The solid catalyst component was used in all cases along with triethyl-aluminium (TEAL) as co-catalyst and dicyclo pentyl dimethoxy silane (D-donor) as donor. The aluminium to donor ratio, the aluminium to titanium ratio and the polymerisation conditions are indicated in Table 2. All products were stabilized by melt mixing a co-rotating twin-screw extruder at 200-230° C. with 0.2 wt.-% of Irganox B225 (1:1-blend of Irganox 1010 (Pentaerythrityl-tetrakis (3-(3',5'-di-tert.butyl-4-hydroxytoluyl)-propionate and tris (2,4-di-t-butylphenyl) phosphate) phosphite) of BASF AG, Germany) and 0.1 wt.-% calcium stearate.

Pilot Scale Examples

All Pilot scale polymers IE2, IE3 and CE4 and CE5 were produced in a Borstar pilot plant with a prepolymerisation reactor, one slurry loop reactor and one or two gas phase reactors.

Illustrative Example, IE2

Catalyst Feeding

Catalyst was fed continuously to the polymerisation in oil slurry by the piston pump.

Co-Catalyst and Donor

Triethylaluminium (TEAL) was used as a co-catalyst with constant feed ratio of 150 g TEAL/ton propylene. Dicyclopentyldimethoxysilane (Donor D) was used as an external donor with TEAl/Donor ratio of 5 mol/mol. Actual donor feed was 23 g/ton propylene.

Prepolymerisation Reactor

The catalyst was flushed with propylene to the Prepolymerisation reactor in which also TEAL and D-donor were fed. Prepolymerisation reactor, CSTR was operated at 30° C. and 55 barg pressure. The residence time of the particles in propylene slurry was about 0.38 h.

Loop Reactor

The prepolymerised catalyst component was used in loop reactor and gas phase reactor (GPR) connected in series. The loop reactor was operated at 80° C. and in 55 barg pressure. Propylene feed to prepolymerisation and loop reactor was in total 175 kg/h. Polymer residence time in loop reactor was around 0.6 h and the production rate was 30 kg/h.

Gas Phase Reactor

Polymer slurry was fed from loop to the gas phase reactor (GPR) as a direct feed without flash. The GPR was operated at 80° C. temperature and the pressure was 30 barg. Propylene concentration was ~75 mol-%. Polymer residence time in GPR was about 2 hours.

Product Control

The production split between loop and GPR was controlled to be close to 50/50%. The MFR (2.16 kg/230° C.) was controlled to be about 0.6 in Loop and between 7-8 after GPR by hydrogen feed.

Results

No operation issues were seen. The crystallisation temperature of the final pellet material was high, i.e. 128° C.

About 400 kg material was produced in stable conditions. Polymerisation conditions and product characteristics are shown in Table 2 and 3.

Illustrative Example, IE3

The procedure was the same as in IE1 but polymer grade was different. MFR level was higher and the $2^{nd}$ GPR i.e. rubber GPR was taken into operation. Polymerisation was continued in rubber GPR which was operated at the temperature of 75° C. and in 24 barg pressure.

Results

No fouling was observed. No stickiness of the polymer was found. No static electricity was observed in rubber GPR. All in all the operation was stable and about 400 kg material was collected. The crystallisation temperature of the final pellet material was high, i.e. 131° C. Polymerisation conditions and product characteristics are shown in Table 2 and 4.

Comparative Example, CE4

The procedure was the same as in IE2 but the catalyst was not modified with Vinylcyclohexane.

The product was also unimodal.

Results

The crystallisation temperature was much lower compared to IE1, namely 122° C.

Polymerisation conditions and product characteristics are shown in Table 2 and 3.

Comparative Example, CE5

The procedure was the same as in IE3 but the catalyst was not modified with Vinylcyclohexane.

Results

Stable reference material production. The crystallisation temperature was much lower compared to IE3 i.e. 124° C.

Polymerisation conditions and product characteristics are shown in Table 2 and 4.

TABLE 2

| Pilot scale polymerisation examples | | | | |
|---|---|---|---|---|
| | IE 2 | IE 3 | CE 4 | CE 5 |
| TEAL/Ti [mol/mol] | 90 | 90 | 90 | 90 |
| TEAL/Donor [mol/mol] | 5 | 5 | 5 | 5 |
| Prepolymerisation | | | | |
| B1 Temperature [° C.] | 30 | 31 | 29 | 30 |
| B1 Ethylene feed [kg/h] | 0.08 | 0.08 | 0.32 | 0.2 |
| B1 Residence time [h] | 0.38 | 0.38 | 0.36 | 0.38 |
| Loop | | | | |
| B2 Temperature [° C.] | 80 | 80 | 75 | 80.01 |
| B2 H2/C3 ratio [mol/kmol] | 0.18 | 6.63 | 1.5 | 5.99 |
| B2 C2/C3 ratio [mol/kmol] | 0.4 | 0.37 | 1.4 | 0.82 |
| B2 Split [%] | 50 | 40 | 50 | 40 |
| B2 MFR2 [g/10 min] | 0.6 | 40.6 | 7.8 | 42.9 |
| GPR1 | | | | |
| B3 Temperature [° C.] | 80.0 | 80.0 | 80 | 80.0 |
| B3 C2/C3 ratio [mol/kmol] | 0 | 0 | 0.7 | 0.08 |
| B3 H2/C3 ratio (mol/kmol) | 79.8 | 73.2 | 17.3 | 62.5 |
| B3 split [%] | 50 | 40 | 50 | 41 |
| B3 MFR2 [g/10 min] | 7.4 | 45.4 | 8.2 | 39.7 |
| B3 XS [wt. %] | 1.7 | 1.9 | 2.3 | 2.0 |
| B3 Ethene content [wt. %] | 0 | 0 | 0 | 0 |

TABLE 2-continued

Pilot scale polymerisation examples

|  | IE 2 | IE 3 | CE 4 | CE 5 |
|---|---|---|---|---|
| GPR2 |  |  |  |  |
| B4 Temperature (° C.) | — | 75 | — | 75 |
| B4 Pressure (kPa) | — | 2400 | — | 2400 |
| B4 C2/C3 ratio [mol/kmol] | — | 626.58 | — | 594.53 |
| B4 H2/C2 ratio [mol/kmol] | — | 127.66 | — | 124.41 |
| B4 split [%] | 0 | 20 | 0 | 19 |
| Final product |  |  |  |  |
| MFR$_2$ [g/10 min] | 7.7 | 21.0 | 7.5 | 17.2 |
| Ethene content [wt. %] | 0.0 | 9.3 | 0.0 | 10.3 |
| XS [wt. %] | 2.1 | 16.9 | 2.2 | 20 |
| Ethene of XS [wt. %] | 0 | 47.2 | 0 | 53.4 |
| Intrinsic viscosity of XS [l/g] | — | 2.3 | — | 2.4 |

Comparative CE6 is the commercial grade Bormod HD905CF of Borealis AG (Austria) characterized by the polymer properties of Table 3.

TABLE 3

Pilot scale polymer characteristics (homopolymers)

|  | IE2 | CE6 | CE4 |
|---|---|---|---|
| MFR$_2$ [g/10 min] | 7.7 | 8 | 7.5 |
| <mmmm> (NMR) [mol. %] | 97.2 | 97.6 | 95.8 |
| XCS [wt. %] | 2.1 | 2.2 | 1.95 |
| DSC |  |  |  |
| Tc [° C.] | 128 | 127 | 122 |
| Tm [° C.] | 167 | 166 | 163 |
| Hm [J/g] | 105 | 105 | 105 |
| DMA |  |  |  |
| Tg (PP) [° C.] | 0.1 | −0.5 | 0.0 |
| G'(23° C.) [MPa] | 1045 | 1063 | 972 |
| Mechanics |  |  |  |
| Flexural modulus [MPa] | 1960 | 1891 | 1677 |
| NIS 23° C. [kJ/m$^2$] | 2 | 1.9 | 2.5 |
| Optics |  |  |  |
| Haze (2 mm) [%] | 80 | 79 | 93 |

Comparative CE7 is the commercial grade Borpact BF970MO of Borealis AG (Austria) characterized by the polymer properties of table 4.

TABLE 4

Pilot scale polymer characteristics (copolymers)

|  | IE3 | CE7 | CE5 |
|---|---|---|---|
| MFR$_2$ [g/10 min] | 21.5 | 19 | 18.7 |
| NMR results |  |  |  |
| C2 total [wt %] | 10.4 | 8.8 | 10.9 |
| C2 (XCS) [wt %] | 45.6 | 38.7 | 45.3 |
| EEE [mol %] | 22.54 | 14.8 | 22.15 |
| EEP [mol %] | 22.86 | 21.32 | 23.1 |
| PEP [mol %] | 10.11 | 12.12 | 10.07 |
| (PEP)norm [%] | 18.2 | 25.1 | 18.2 |
| XCS |  |  |  |
| XCS [l/g]wt. % | 16.5 | 18 | 21.1 |
| IV(XCS) [dl/g] | 3.03 | 3.53 | 3.12 |

TABLE 4-continued

Pilot scale polymer characteristics (copolymers)

|  | IE3 | CE7 | CE5 |
|---|---|---|---|
| DSC |  |  |  |
| Tc [° C.] | 131 | 130 | 124 |
| Tm(PP) [° C.] | 168 | 166 | 164 |
| Tm(PE) [° C.] | 118 | 117 | 118 |
| Hm(PP) [J/g] | 91.6 | 102 | 83.5 |
| Hm(PE)[J/g] | 0.4 | 0.1 | 0.2 |
| DMA |  |  |  |
| Tg(EPR) [° C.] | −52.9 | −59 | −54.8 |
| Tg(PP) [° C.] | −0.1 | −1.3 | −0.3 |
| G'(23° C.) [MPa] | 657 | 627 | 616 |
| Mechanics |  |  |  |
| Flexural modulus [MPa] | 1422 | 1403 | 1166 |
| NIS 23° C. [kJ/m$^2$] | 7.4 | 9.3 | 9.1 |
| NIS −20° C. [kJ/m$^2$] | 3.8 | 4.4 | 4.9 |
| Sum (G' + Flex Mod) | 2079 | 2030 | 1782 |

The invention claimed is:

1. A nucleated polypropylene composition comprising:
    a) at least one propylene homopolymer and
    b) a polymeric nucleating agent
    wherein the nucleated polypropylene composition and/or the propylene homopolymer is free of phthalic acid esters as well as their respective decomposition products and
    wherein said nucleated polypropylene composition has a sum of [G' (Storage Modulus; measured by Dynamic Mechanical Analysis according to ISO 6721-7)+Flexural Modulus (determined according to ISO178)], each expressed in MPa, of at least 2040 MPa.

2. The nucleated polypropylene composition according to claim 1, comprising at least one propylene-copolymer-rubber phase, wherein the copolymer comprises ethylene and/oror a $C_4$-$C_{10}$ alpha-olefin.

3. The nucleated polypropylene composition according to claim 1, comprising:
    a) the at least one propylene homopolymer and
    b) a second propylene homopolymer,
    wherein said nucleated polypropylene composition has a:
    i) sum of [G' (Storage Modulus, measured by Dynamic Mechanical Analysis according to ISO 6721-7)+Flexural Modulus (determined according to ISO178)] each expressed in MPa of at least 2970 MPa, and
    ii) and a Notched Impact strength+23° C. according Charpy ISO 179/1eA of at least 1.8 kJ/m$^2$.

4. The nucleated polypropylene composition according to claim 2, wherein the nucleated polypropylene composition comprises at least one propylene-copolymer-rubber phase and optionally a second propylene-copolymer-rubber phase, wherein said nucleated polypropylene composition has a:
    i) sum of [G' (Storage Modulus, measured by Dynamic Mechanical Analysis according to ISO 6721-7)+Flexural Modulus (determined according to ISO178)] each expressed in MPa of at least 2060 MPa, and
    ii) and a Notched Impact strength+23° C. according Charpy ISO 179/1eA of at least 5 kJ/m$^2$.

5. The nucleated polypropylene composition according to claim 1, wherein the polymeric nucleating agent is compound according formula:

CH2=CH—CHR1R2, wherein R1 and R2, together with the carbon atom they are attached to, form an optionally substituted saturated or unsaturated or aromatic ring or a fused ring system, wherein the ring or fused ring moiety contains four to 20 carbon atoms, or independently represent a linear or branched C4-C30 alkane, C4-C20 cycloalkane or C4-C20 aromatic ring.

6. The nucleated polypropylene composition according to claim 1, wherein the composition has been polymerised in the presence of:
 a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound,
 b) a co-catalyst (Co), and
 c) optionally an external donor (ED).

7. The nucleated polypropylene composition according to claim 6, wherein:
 a) the internal donor (ID) is selected from optionally substituted malonates, maleates, succinates, glutarates, cyclohexene-1,2-dicarboxylates, benzoates and derivatives and/or mixtures thereof; and
 b) the molar-ratio of co-catalyst (Co) to external donor (ED) [Co/ED] is 5 to 45.

8. The nucleated polypropylene composition according to claim 1, wherein the composition is produced in a sequential polymerisation process comprising at least two reactors (R1) and (R2), in the first reactor (R1) a first propylene homopolymer fraction (H-PP1) is produced and subsequently transferred into the second reactor (R2), in the second reactor (R2) a second propylene homopolymer fraction (H-PP2) or a first propylene-ethylene rubber fraction (R-PP1) is produced in the presence of the first propylene homopolymer fraction (H-PP1).

9. The nucleated polypropylene composition according to claim 8, wherein the process for producing the propylene composition comprises the step of preparing a propylene polymer using a polymerisation catalyst, obtained by polymerising a Ziegler-Natta polymerisation catalyst with a vinyl compound of the formula $CH_2=CH-CHR1R2$, wherein R1 and R2, together with the carbon atom they are attached to, form an optionally substituted saturated or unsaturated or aromatic ring or a fused ring system, wherein the ring or fused ring moiety contains four to 20 carbon atoms, or independently represent H or a linear or branched C4-C30 alkane, C4-C20 cycloalkane or C4-C20 aromatic ring, whereby at least one of R1 and R2 is not H, at a weight ratio of the vinyl compound to polymerisation catalyst amounting to 3 or more, until the concentration of residual vinyl compound is less than about 0.5 wt %.

10. A moulded article comprising the nucleated polypropylene composition according to claim 1.

* * * * *

UNITED STATES PATENT AND TRADEMARK OFFICE
CERTIFICATE OF CORRECTION

PATENT NO. : 10,125,248 B2
APPLICATION NO. : 15/316442
DATED : November 13, 2018
INVENTOR(S) : Jingbo Wang et al.

Page 1 of 1

It is certified that error appears in the above-identified patent and that said Letters Patent is hereby corrected as shown below:

Column 26, Line 38 reads "oror" should read --or--

Signed and Sealed this
Twenty-ninth Day of January, 2019

Andrei Iancu
*Director of the United States Patent and Trademark Office*